A. M. PORTER.
ATTACHMENT FOR TRACTORS.
APPLICATION FILED JULY 3, 1919.
1,361,742.
Patented Dec. 7, 1920.
2 SHEETS—SHEET 1.
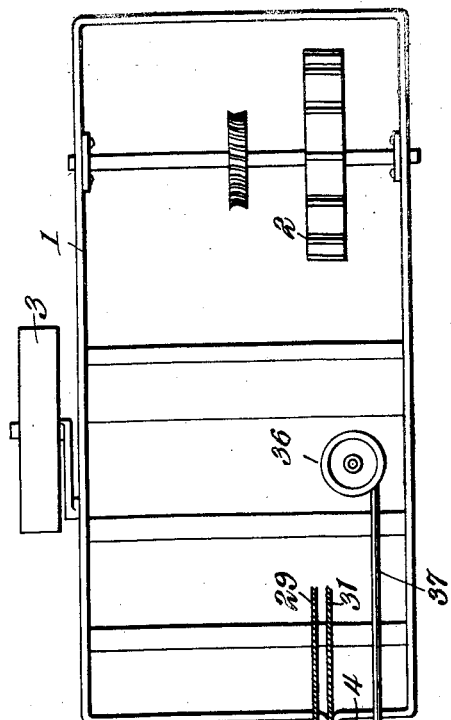
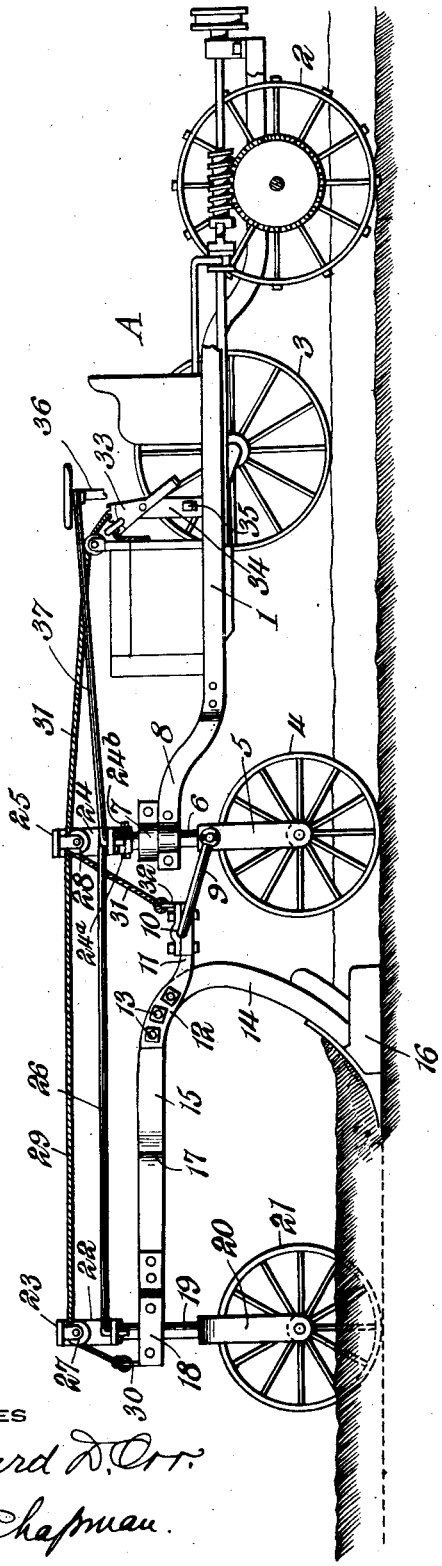
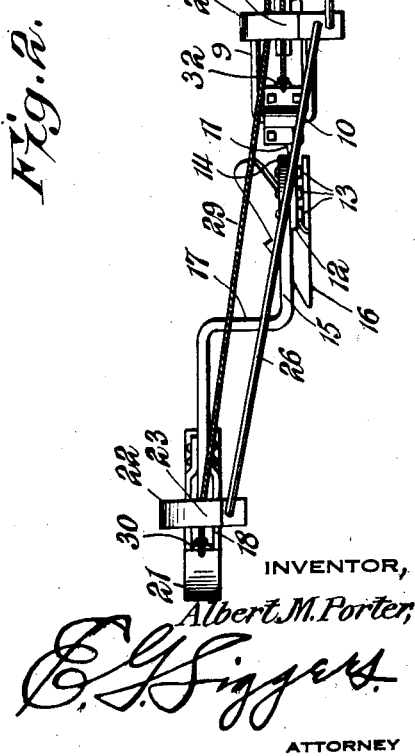
WITNESSES
Howard D. Orr.
F. T. Chapman.
INVENTOR,
Albert M. Porter,
BY
C. G. Siggers.
ATTORNEY A. M. PORTER.
ATTACHMENT FOR TRACTORS.
APPLICATION FILED JULY 3, 1919.
1,361,742.
Patented Dec. 7, 1920.
2 SHEETS—SHEET 2.
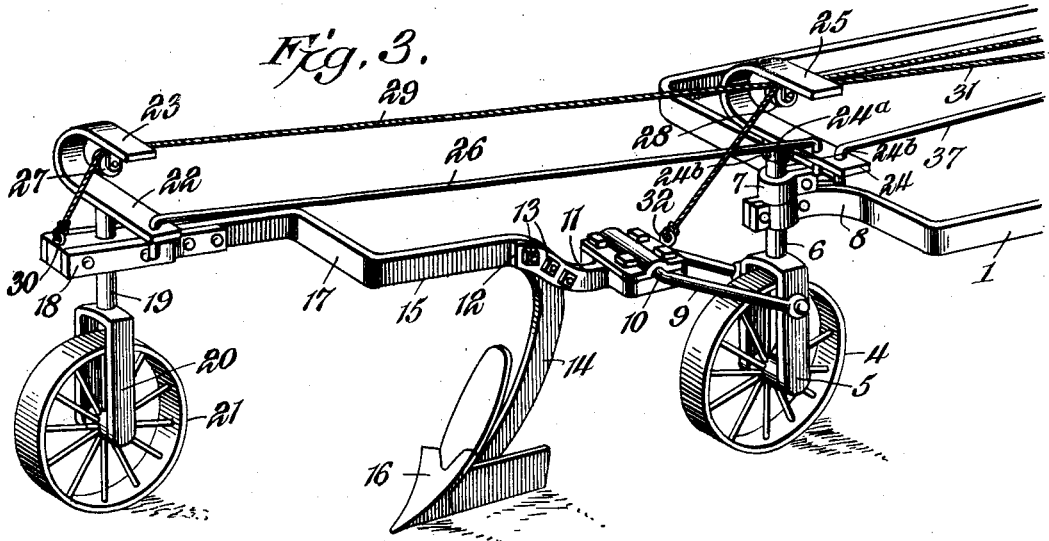
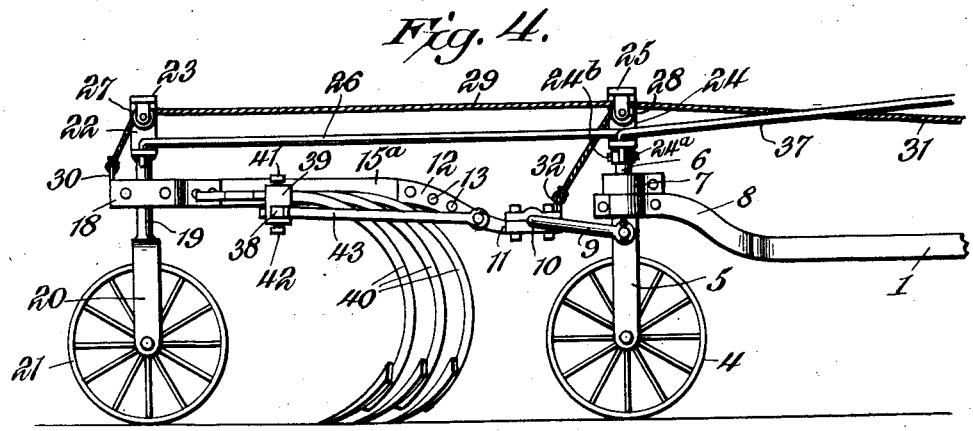
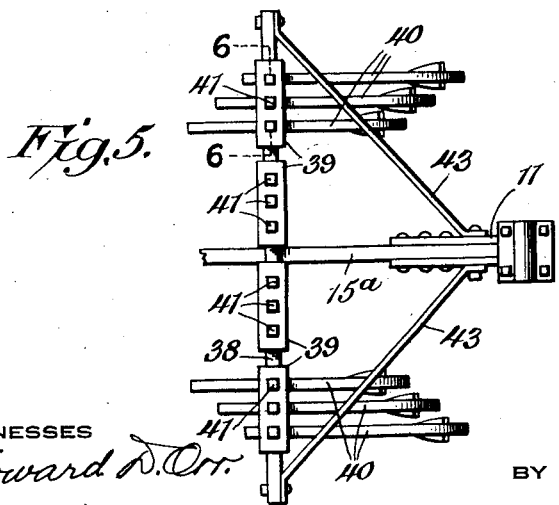
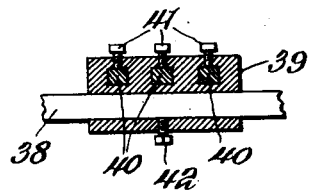
Albert M. Porter,
INVENTOR,
WITNESSES
BY
ATTORNEY

UNITED STATES PATENT OFFICE.

ALBERT M. PORTER, OF LINN, KANSAS.

ATTACHMENT FOR TRACTORS.

1,361,742. Specification of Letters Patent. Patented Dec. 7, 1920.

Application filed July 3, 1919. Serial No. 308,451.

*To all whom it may concern:*

Be it known that I, ALBERT M. PORTER, a citizen of the United States, residing at R. F. D. #3, in the county of Linn and State of Kansas, have invented a new and useful Attachment for Tractors, of which the following is a specification.

This invention has reference to attachments for tractors, and its object is to provide an attachment capable of carrying a plow or a cultivator, or other ground-working implement in such manner as to precede the tractor so as to be pushed thereby.

In accordance with the invention, the attachment carrying the chosen ground working implement or implements is attached to a forward steering wheel provided on the tractor in such manner that the rear end of the attachment participates in the sidewise or steering movements of the steering wheel and the connection is such that the rear end of the attachment is capable of up and down movements, permitting the lifting or lowering of the attachment with relation to the ground. The main portion of the attachment, which may be in the form of a beam or bar, or bar-like frame, may furthermore be provided with a steering wheel at its forward end and the tractor steering wheel and attachment steering wheel are connected together for steering purposes so as to move simultaneously. Moreover, provision is made whereby either or both ends of the attachment beam may be adjusted up and down in addition to the sidewise movements utilized in steering.

The invention will be best understood from a consideration of the following detailed description taken in connection with the accompanying drawings, forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is a side elevation of a tractor with a plow attachment, included in the invention, secured thereto.

Fig. 2 is a plan view of the structure shown in Fig. 1.

Fig. 3 is a perspective view of the plow attachment and a small portion of the front of the tractor frame.

Fig. 4 is an elevation similar to Fig. 1, but omitting the greater portion of the tractor and showing a cultivator in place of the plow.

Fig. 5 is a plan view of a portion of the cultivator attachment.

Fig. 6 is a section on the line 6—6 of Fig. 5.

Referring to the drawings, there is shown a tractor A, disclosing a small portion of the frame 1 of the tractor, a tractor wheel 2, a supporting or balancing wheel 3, and the steering wheel 4, the latter being mounted in a yoke 5, carried by a post 6 having an upright journal bearing 7 in the forward end of the frame 1, which latter is provided with a forward prolongation 8 to carry the journal bearing 7. The tractor wheel 2 and steering wheel 4 are in the same longitudinal upright plane.

Pivotally carried by the yoke 5 is a bail 9 of sturdy construction, and connected to the yoke portion 10 of the bail, is a casting 11, having a forward prolongation or arm 12 fastened by bolts 13 to the junction portion of a plow standard 14 and beam 15 in the particular showing of Figs. 1 to 3. The standard 14 carries a plow 16 which may be of ordinary construction, and the beam 15 is offset intermediately of its length, as indicated at 17, this offset being shown as of angular contour, although such particular shape is not obligatory.

The offset 17 is such as to bring the forward end of the beam in line with the furrow preceding the one being formed by the plow. At the front extremity of the beam 15, there is provided a journal bearing 18 for an upright post or spindle 19, which at the lower end is provided with a yoke 20 in which is journaled a wheel 21, serving, like the wheel 4, as a steering wheel. Fast to the top of the post or spindle 19, is an arm 22, having a return portion 23, overhanging that part of the arm 22 fast to the spindle 19. The post or spindle 6 carries at its upper end an arm 24, provided with a return portion 25 overhanging the main portion of the arm 24. Those ends of the arms 22 and 24 remote from the overhanging portions, are connected by a rod 26 to cause simultaneous movements of the two arms. The overhang 23 carries a pulley 27, and the overhang 25 carries a double pulley 28. Extending about the pulley 27 is a rope or strand 29 fast at one end to the forward end of the beam 15, as indicated at 30.

The rope 29 also is passed over one member of the double pulley 28. Another rope or strand 31 is passed over the other member of the double pulley 28, and at its forward end is connected to the casting 11, as shown at 32. The two strands 29 and 31 are continued rearwardly over the tractor A to a suitable point in the neighborhood of the driver's seat, where the rope 31 is connected to a rock lever 33, mounted on the post 34, the lever having a latch member 35 associated therewith to permit the lever to be locked in a desired position. The rope 29 is continued to some suitable point, as to a lever, not shown, whereby it may be operated.

On the tractor there is mounted a steering device 36, connected by a link 37 to the arm 24 to one side of the post 6, and the link 26 connects the two arms 22 and 24 also at the like side of the respective posts 6 and 19. The arm 24 is provided with a collar 24ª fitting the post 6 and attachable thereto by set screws 24ᵇ.

In Figs. 4, 5 and 6, there is shown a beam 15ª which may be a straight beam instead of an offset beam, as in Fig. 1, and associated figures. The beam 15ª has secured thereto a cross bar 38, on which are located blocks 39, each carrying cultivator teeth 40. Set screws 41, 42, provide for the adjustment of the cultivator teeth in the blocks and the adjustment of the blocks along the bar 38. Braces 43 connecting the ends of the bar 38 with the casting 11, serve to stiffen the structure. Manipulation of the rope or strand 29 permits the setting of the implement to a fixed depth. The strand 31 permits the raising and lowering of the implement at will.

When the attachment is in place the set screws 24ᵇ are loose so that movements of either the post 6 or arm 24 are not participated in by the other. When the attachment is removed and it is desired to steer the tractor the arm is secured firmly to the post 6 by the set screws and the steering is performed through the rod 37 then acting upon the steering wheel 4 through the arm 24. With the implement in place and the set screws 24ᵇ loosened the rods 37 and 26 together with the arms 24 and 22 cause turning movements of the steering wheel 21 about their upright axes and the steering wheel 21 participates in the movements of the arm 22, the bail 9 connected with the fork of the steering wheel 4 causes the whole attachment to move about the upright axis of the post 6 for steering purposes. It will be seen from the above that the wheel 4 acts as a steering wheel for the tractor when the attachment is removed, and serves as a castering wheel when the attachment is in use, the wheel 21 then performing the function of a steering wheel.

When the plow or cultivator is in operation, the plow or like structure is mounted in advance of the tractor, and hence is pushed over the ground, both plowed and being plowed, and the plow, cultivator or like structure may serve as a means for steering both the tractor and the attachment.

As the tractor travels along the ground the steering wheel 4, and the tractor wheel 2 of which there is but one, travel in the furrow formed by the plow 16, the wheel 3 traveling on ground which has already been turned over. The wheel 21 supports the forward end of the beam 15 or 15ª as the case may be, through the strand 29, the wheel 21 traveling in the previously formed furrow to the right in the particular arrangement shown in the drawings. The rear end of the beam 15 or 15ª is supported by the strand 31 but is constrained to hold its relation to the wheel 4, in a front to rear direction, by the bail 9 which participates in the steering movements of the wheel 4. In this manner the operator may adjust the plow as to depth of cut or furrow, while the steering of the plow, and with it the tractor, is controlled by the operator through the links 37 and 26.

What is claimed is:—

1. An attachment for a tractor having a front dirigible wheel movable on a vertical axis, comprising a beam carrying a ground-working implement and projecting forwardly from the front end of the tractor, said beam having a connection at its rear end with said wheel so as to participate in the movements thereof on its vertical axis.

2. An attachment for a tractor having a front dirigible wheel movable on a vertical axis, comprising a beam for carrying a ground-working implement and projecting forwardly from the front end of the tractor, said beam having a connection at its rear end with said wheel so as to participate in the movements thereof on its vertical axis, and the connection being pivotally joined to the dirigible wheel to move with relation thereto about an axis transverse to the vertical axis of the dirigible wheel.

3. The combination with a tractor having a front dirigible wheel movable on a vertical axis, of a beam for carrying a ground-working implement and projecting forwardly from said wheel and connected at the rear end thereto for participation in the movements of said wheel on its vertical axis, the connection comprising a bail pivotally joined to the wheel structure to move about an axis transverse to the vertical axis of said wheel and pivotally connected to the rear end of the beam for movement of the latter in an up and down direction on an axis transverse to the vertical axis of the dirigible wheel.

4. A tractor ground-working machine, comprising a tractor, and a structure carrying a ground-working implement connected to the tractor in front thereof in position to be pushed by the tractor, and means between the tractor and the carrier for the ground-working implement for imparting lateral movements to the carrier for steering the tractor and carrier.

5. A tractor ground-working machine, comprising a tractor with a front dirigible wheel movable on a vertical axis, a carrier for a ground-working implement connected at the rear end to said wheel and provided with a forward steering wheel, and connections between the steering wheel and dirigible wheel and continued to the tractor for utilization of the steering wheel of the carrier as a steering means for both the tractor and ground-working implement.

6. A tractor structure, comprising a tractor with a front dirigible wheel movable on a vertical axis, a forwardly-extending beam for carrying a ground-working implement, and a bail connection between the dirigible wheel of the tractor and the rear end of the beam, holding the latter to said wheel for participation in the movements of said wheel on its vertical axis, and said bail being pivotally connected at the forward end to the rear end of the beam and at the rear end to the dirigible wheel of the tractor for up and down movements of the beam.

7. A tractor having a forward dirigible wheel movable on a vertical axis, a beam connected to said wheel and projecting forwardly therefrom, ground-working means carried by the beam in advance of the tractor and dirigible wheel thereof, a steering wheel at the forward end of the beam, connections between the two wheels and carried to the tractor for operating said wheels, and means supported by said wheels and connected to the beam for raising and lowering the latter with respect to the wheels.

8. A tractor having a forward dirigible wheel movable on a vertical axis, a beam connected to said wheel and projecting forwardly therefrom, ground-working means carried by the beam in advance of said wheel of the tractor, a steering wheel at the forward end of the beam, steering rods between the two wheels for causing their simultaneous steering movements and continued to the tractor for manipulation by an operator, and strands connected to opposite ends of the beam and supported by said wheels for raising and lowering the beam with respect to the wheels.

9. A tractor having a forward dirigible wheel movable on a vertical axis, a beam connected to said wheel and projecting forwardly therefrom, ground-working means carried by the beam in advance of the steering wheel of the tractor, a steering wheel at the forward end of the beam, steering rods between the two wheels for causing their simultaneous steering movements and continued to the tractor for manipulation by an operator, and strands connected to opposite ends of the beam and supported by said wheels for raising and lowering the beam with respect to the wheels, the connection between the rear end of the beam and the tractor dirigible wheel comprising a bail pivoted at the rear end to the dirigible wheel on an axis transverse to said vertical axis and at the forward end to the rear end of the beam to move on an axis parallel with the axis at the rear end of the bail.

10. A tractor provided with a forward dirigible wheel and mounting therefor to move on a vertical axis, a beam projecting forwardly from the tractor, a connection between the rear end of the beam and the dirigible wheel mounting, said connection being pivoted at the ends to the beam and dirigible wheel mounting to permit rising and falling movements of the beam and to hold the beam to participation in the movements of said wheel on its vertical axis, ground-working means carried by the beam, and means controllable from the tractor for causing the sidewise movements of the beam and tractor dirigible wheel to steer the tractor.

11. A tractor plow comprising a tractor having a forward dirigible wheel mounted to move on a vertical axis, a plow beam with a plow thereon, pivotally connected at the rear end to the dirigible wheel of the tractor, a forward steering wheel mounted on the forward end of the plow beam, said plow beam having a lateral offset of an extent corresponding to the spacing of two adjacent furrows, and means for connecting the two wheels to cause their simultaneous steering movements.

12. A tractor plow, comprising a tractor with a dirigible wheel at the forward end, a plow beam connected at the rear end to the dirigible wheel to participate in the movements thereof, a plow on the beam forward of said wheel, a steering wheel mounted on the forward end of the plow beam, connections between the two wheels for causing simultaneous movements thereof, connections between the rear end of the plow beam and the tractor dirigible wheel permitting up and down movements of the beam, and supporting means for the plow beam operable to raise and lower the plow beam, the plow beam being laterally offset intermediate of its length to an extent corresponding to the spacing of two adjacent furrows.

In testimony, that I claim the foregoing as my own, I have hereto affixed my signature.

ALBERT M. PORTER.